US012705239B2

(12) United States Patent
Dar et al.

(10) Patent No.: US 12,705,239 B2
(45) Date of Patent: Aug. 11, 2026

(54) SYSTEM AND METHOD FOR GENERATING WEIGHTED QUERY REPRESENTATIONS FOR ENHANCED RETRIEVAL AUGMENTED GENERATION

(71) Applicant: Dell Products L.P., Round Rock, TX (US)

(72) Inventors: Shaul Dar, Petach Tikva (IL); Ramakanth Kanagovi, Hyderabad (IN); Guhesh Swaminathan, Chennai (IN); Rajan Kumar, Nawada (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/732,372

(22) Filed: Jun. 3, 2024

(65) Prior Publication Data

US 2025/0371007 A1 Dec. 4, 2025

(51) Int. Cl.
*G06F 16/2453* (2019.01)

(52) U.S. Cl.
CPC .............................. *G06F 16/24542* (2019.01)

(58) Field of Classification Search
CPC ................................................ G06F 16/24542
See application file for complete search history.

(56) References Cited

U.S. PATENT DOCUMENTS 12,235,882 B1 * 2/2025 Chawla ................. G06F 16/285
2011/0047161 A1 * 2/2011 Myaeng ............. G06F 16/3338 707/E17.069
2022/0114340 A1 * 4/2022 Graeser .................. G06N 3/045
2025/0053735 A1 * 2/2025 Shevchenko ........... G06F 40/30
2025/0190459 A1 * 6/2025 Conway ............... G06N 3/0475

OTHER PUBLICATIONS

Rochan, A., P. Sowmya, and D. Anand Joseph Daniel. “Large Language Model Based Document Query Solution Using Vector Databases.” 2024 International Conference on Advances in Data Engineering and Intelligent Computing Systems (ADICS). IEEE, 2024. (Year: 2024).*

Arefeen MA, Debnath B, Chakradhar S. Leancontext: Cost-efficient domain-specific question answering using llms. Natural Language Processing Journal. Jun. 1, 2024;7:100065. (Year: 2024).*

Chizzola, Andrea. “Mylearningtalk: Developing a generative ai-powered intelligent tutoring system.” (2023). (Year: 2023).*

(Continued)

*Primary Examiner* — Mohsen Almani

(74) *Attorney, Agent, or Firm* — Brian J. Colandreo; Heath M. Sargeant; Holland & Knight LLP

(57) ABSTRACT

A method, computer program product, and computing system for processing a query using a generative artificial intelligence (AI) model. A topic of the query is extracted. A weighting for the topic of the query is generated. A weighted query topic embedding for the topic of the query is generated. A candidate chunk is identified from a plurality of chunks of a target document by determining a similarity between the weighted query topic embedding and a plurality of chunk embeddings for the plurality of chunks. A prompt is generated using the query and the candidate chunk. The prompt is provided to the generative AI model.

20 Claims, 5 Drawing Sheets

(56) References Cited

OTHER PUBLICATIONS

Jha, Akshita, et al. "Supervised contrastive learning for interpretable long-form document matching." ACM Transactions on Knowledge Discovery from Data 17.2 (2023): 1-17. (Year: 2023).*
Jiang, Zhengbao, et al. "Active retrieval augmented generation." Proceedings of the 2023 Conference on Empirical Methods in Natural Language Processing. 2023. (Year: 2023).*
Asmala, Samuli. "Improving the Search of Medical Articles Using Sentence Transformers." (2024). (Year: 2024).*
Onan, Aytuğ, and Mansur Alp Toçoğlu. "Weighted word embeddings and clustering-based identification of question topics in MOOC discussion forum posts." Computer Applications in Engineering Education 29.4 (2021): 675-689. (Year: 2021).*
Salton, Gerard, and Christopher Buckley. "Term-weighting approaches in automatic text retrieval." Information processing & management 24.5 (1988): 513-523. (Year: 1987).*
Zhuang, Yueting, et al. "Probabilistic word selection via topic modeling." IEEE Transactions on Knowledge and Data Engineering 27.6 (2014): 1643-1655. (Year: 2014).*
Landolsi MY, Ben Romdhane L. TD-CRESTS: Top-Down Chunk Retrieval Based on Entity, Section, and Topic Selection. InInternational Conference on Research Challenges in Information Science May 2, 2024 (pp. 35-46). Cham: Springer Nature Switzerland. (Year: 2024).*

* cited by examiner

SYSTEM AND METHOD FOR GENERATING WEIGHTED QUERY REPRESENTATIONS FOR ENHANCED RETRIEVAL AUGMENTED GENERATION

BACKGROUND

Generative artificial intelligence (AI) models, such as Large Language Model (LLMs) s have recently proven to be a better alternative to traditional search engines, helping users find pieces of information they are looking for, and able to provide more concise and relevant answers, albeit with a risk that the answers may be irrelevant or incorrect.

In some instances, the query that a user types is given as input to the LLM, along an appropriate context, which is the text that the LLM should "search" for in an answer, a technique that is called prompt engineering. The main problem with this approach is that the size of the prompt is limited. For example, the limit for GPT3.5-Turbo is 4,096 tokens, the limit for GPT4 is 8,192 tokens, and the limit for GPT-4-32k is 32,768 tokens. Documents or other content that can be searched using the LLM are often orders of magnitude larger than the prompt size limit. For example, the size of a single example storage system user guide is twenty megabytes, and the size of the complete set of relevant installation documents and knowledge base articles ranges between hundreds of megabytes to hundreds of gigabytes. Accordingly, Retrieval Augmented Generation (RAG) is used to break input documents into chunks that are small enough to fit the prompt size limitations. It then uses common indexing and retrieval techniques to match user queries to the most relevant content chunks, and then combines the user query and context (one or more chunks) as a prompt to the LLM and presents the answers to the user.

In practice when the RAG methodology is used, the results are often disappointing. The answers provided by the LLM may be wrong or irrelevant, phrased incorrectly, or even "made up" (hallucinations). The main reasons are a bad chunking methodology and/or a poor match between the query and chunks, causing the context presented to the LLM to be based on incorrect content chunks, resulting in wrong answers. Thus, the information retrieval stage, namely effective chunking, chunk indexing, and the similarity search for a small set of chunks (out of thousands and potentially millions) that are the best match for a given query may have a much greater impact on query processing performance than the final LLM stage.

SUMMARY OF DISCLOSURE

In one example implementation, a computer-implemented method executed on a computing device may include, but is not limited to, processing a query using a generative artificial intelligence (AI) model. A topic of the query is extracted. A weighting for the topic of the query is generated. A weighted query topic embedding for the topic of the query is generated. A candidate chunk is identified from a plurality of chunks of a target document by determining a similarity between the weighted query topic embedding and a plurality of chunk embeddings for the plurality of chunks. A prompt is generated using the query and the candidate chunk. The prompt is provided to the generative AI model.

One or more of the following example features may be included. Identifying a candidate chunk may include identifying a predefined number of most similar candidate chunks. The plurality of chunks are generated for a plurality of text portions of the target document. A plurality of chunk topics are generated by extracting a topic for each respective chunk of the plurality of chunks. A weighting for the topic is generated for each respective chunk of the plurality of chunks. A plurality of weighted chunk topic embeddings are generated by generating a weighted chunk topic embedding for each chunk. A weighted chunk topic embedding is generated for each topic of a plurality of topics for a respective chunk. A weighted average chunk topic embedding is generated for the respective chunk from the weighted chunk topic embedding for each topic of the plurality of topics for the respective chunk. Extracting the topic may include extracting a plurality of topics for the query. Generating the weighting for the topic may include generating a weighting for each topic of the plurality of topics for the query. Generating the weighted query topic embedding may include generating a weighted query topic embedding for each topic; and generating a weighted average query topic embedding from the weighted query topic embedding for each topic.

In another example implementation, a computer program product resides on a computer readable medium that has a plurality of instructions stored on it. When executed by a processor, the instructions cause the processor to perform operations that may include, but are not limited to, processing a query using a generative artificial intelligence (AI) model. A topic of the query is extracted. A weighting for the topic of the query is generated. A weighted query topic embedding for the topic of the query is generated. A candidate chunk is identified from a plurality of chunks of a target document by determining a similarity between the weighted query topic embedding and a plurality of chunk embeddings for the plurality of chunks. A prompt is generated using the query and the candidate chunk. The prompt is provided to the generative AI model.

One or more of the following example features may be included. Identifying a candidate chunk may include identifying a predefined number of most similar candidate chunks. The plurality of chunks are generated for a plurality of text portions of the target document. A plurality of chunk topics are generated by extracting a topic for each respective chunk of the plurality of chunks. A weighting for the topic is generated for each respective chunk of the plurality of chunks. A plurality of weighted chunk topic embeddings are generated by generating a weighted chunk topic embedding for each chunk. A weighted chunk topic embedding is generated for each topic of a plurality of topics for a respective chunk. A weighted average chunk topic embedding is generated for the respective chunk from the weighted chunk topic embedding for each topic of the plurality of topics for the respective chunk. Extracting the topic may include extracting a plurality of topics for the query. Generating the weighting for the topic may include generating a weighting for each topic of the plurality of topics for the query. Generating the weighted query topic embedding may include generating a weighted query topic embedding for each topic; and generating a weighted average query topic embedding from the weighted query topic embedding for each topic.

In another example implementation, a computing system includes at least one processor and at least one memory architecture coupled with the at least one processor, wherein the at least one processor is configured to process a query using a generative artificial intelligence (AI) model. A topic of the query is extracted. A weighting for the topic of the query is generated. A weighted query topic embedding for the topic of the query is generated. A candidate chunk is identified from a plurality of chunks of a target document by determining a similarity between the weighted query topic embedding and a plurality of chunk embeddings for the plurality of chunks. A prompt is generated using the query and the candidate chunk. The prompt is provided to the generative AI model.

One or more of the following example features may be included. Identifying a candidate chunk may include identifying a predefined number of most similar candidate chunks. The plurality of chunks are generated for a plurality of text portions of the target document. A plurality of chunk topics are generated by extracting a topic for each respective chunk of the plurality of chunks. A weighting for the topic is generated for each respective chunk of the plurality of chunks. A plurality of weighted chunk topic embeddings are generated by generating a weighted chunk topic embedding for each chunk. A weighted chunk topic embedding is generated for each topic of a plurality of topics for a respective chunk. A weighted average chunk topic embedding is generated for the respective chunk from the weighted chunk topic embedding for each topic of the plurality of topics for the respective chunk. Extracting the topic may include extracting a plurality of topics for the query. Generating the weighting for the topic may include generating a weighting for each topic of the plurality of topics for the query. Generating the weighted query topic embedding may include generating a weighted query topic embedding for each topic; and generating a weighted average query topic embedding from the weighted query topic embedding for each topic.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
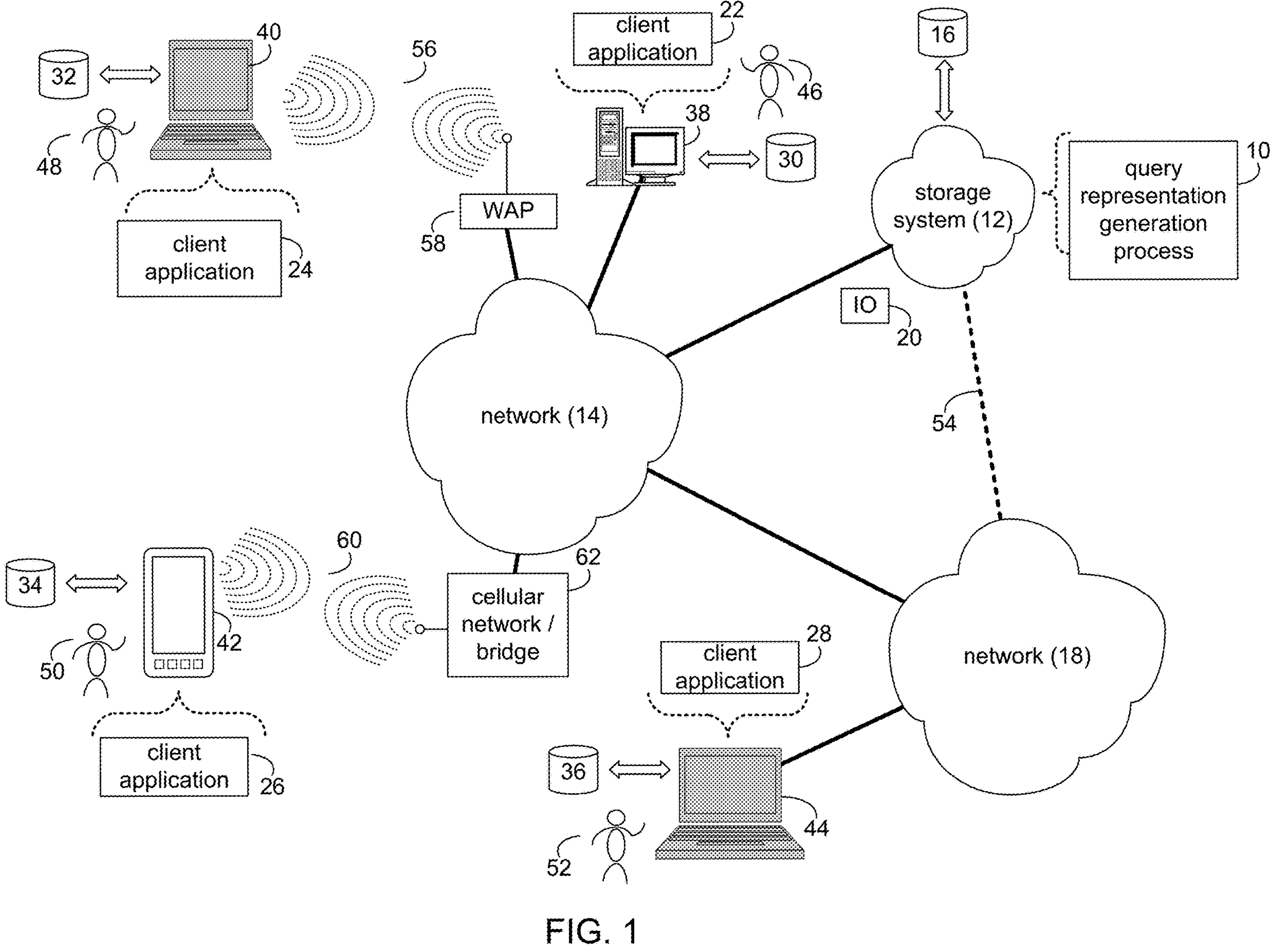
FIG. 1 is an example diagrammatic view of a storage system and a query representation generation process coupled to a distributed computing network according to one or more example implementations of the disclosure.

Referring to FIG. 1, there is shown query representation generation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device, and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of query representation generation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of query representation generation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a query representation generation process, such as query representation generation process 10 of FIG. 1, may include but is not limited to, processing a query using a generative artificial intelligence (AI) model. A topic of the query is extracted. A weighting for the topic of the query is generated. A weighted query topic embedding for the topic of the query is generated. A candidate chunk is identified from a plurality of chunks of a target document by determining a similarity between the weighted query topic embedding and a plurality of chunk embeddings for the plurality of chunks. A prompt is generated using the query and the candidate chunk. The prompt is provided to the generative AI model.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
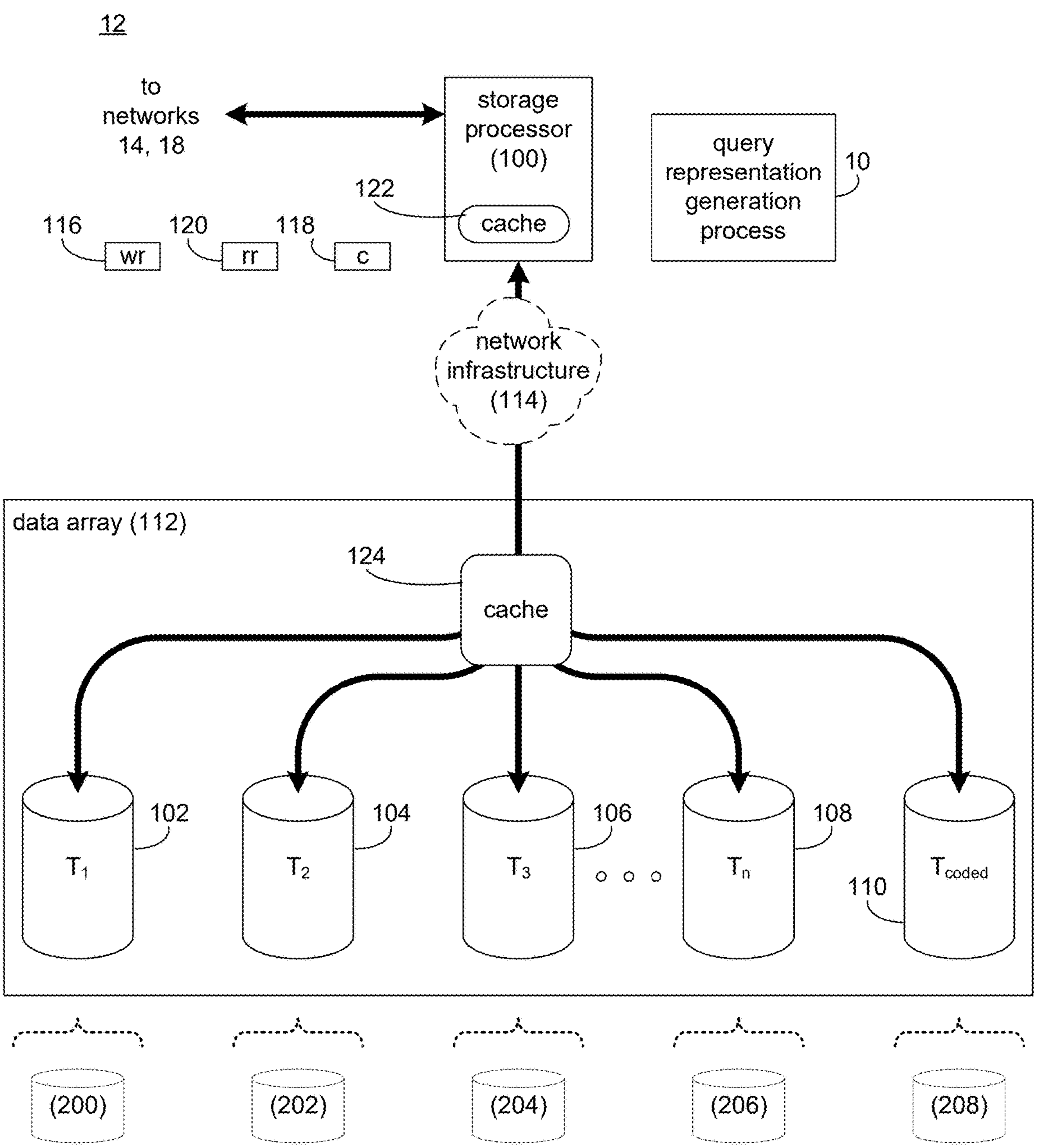
FIG. 2 is an example diagrammatic view of the storage system of FIG. 1 according to one or more example implementations of the disclosure.

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of query representation generation process 10. The instruction sets and subroutines of query representation generation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of query representation generation process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of query representation generation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of query representation generation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Query Representation Generation Process

Figure 3:
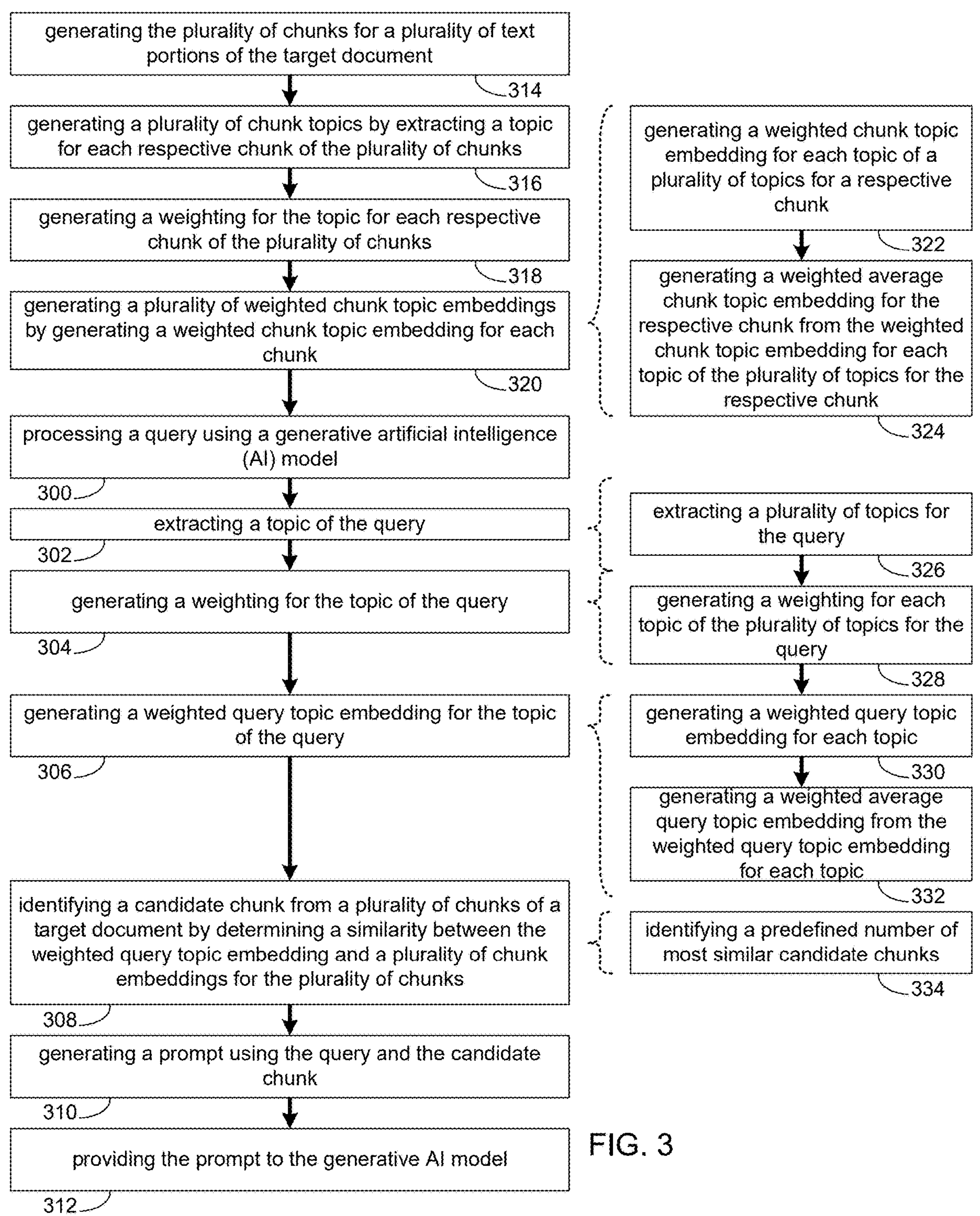
FIG. 3 is an example flowchart of query representation generation process according to one or more example implementations of the disclosure.
Figure 4:
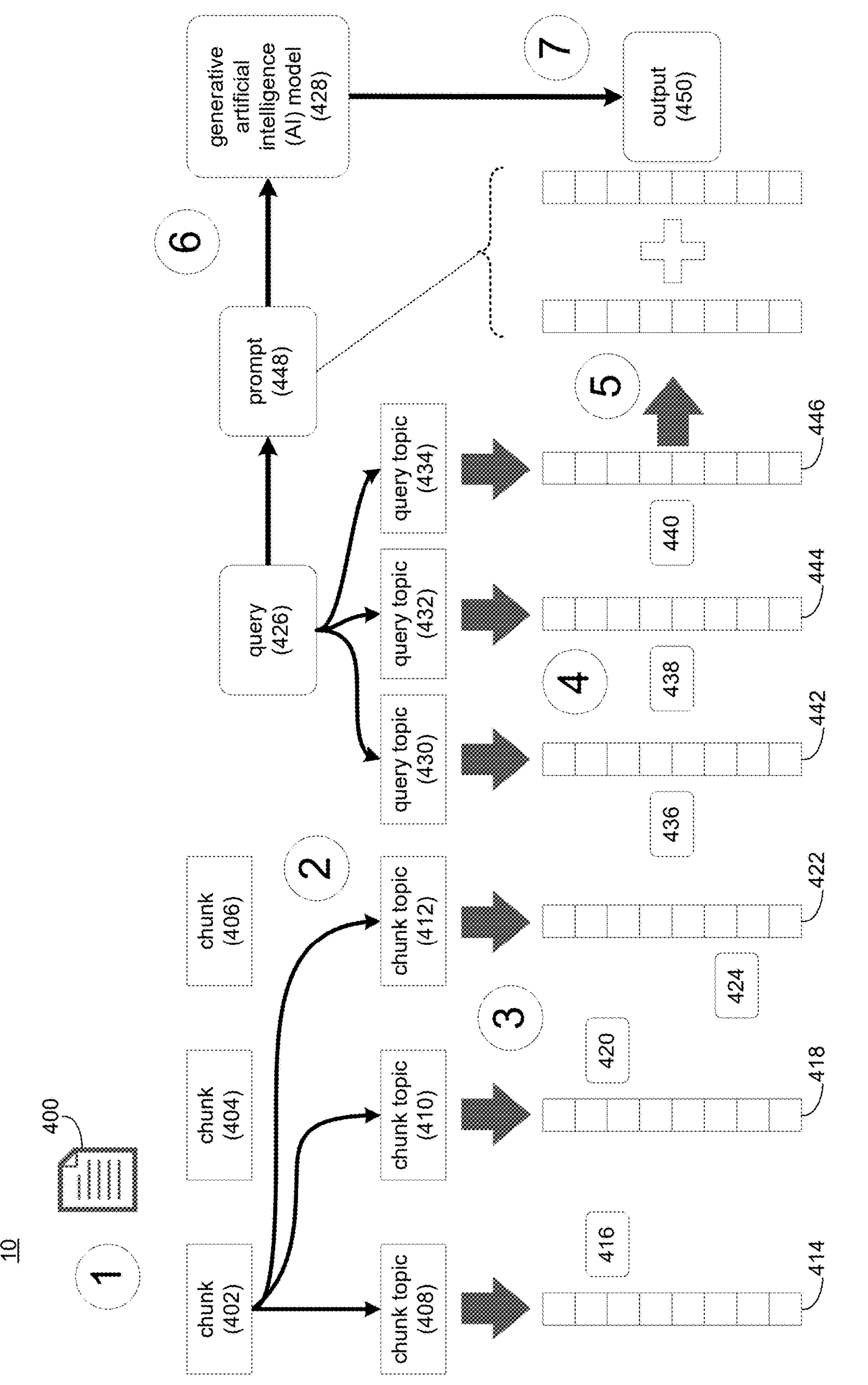
FIG. 4 is an example diagrammatic view of a retrieval augmented generation (RAG) process according to one or more example implementations of the disclosure.
Figure 5:
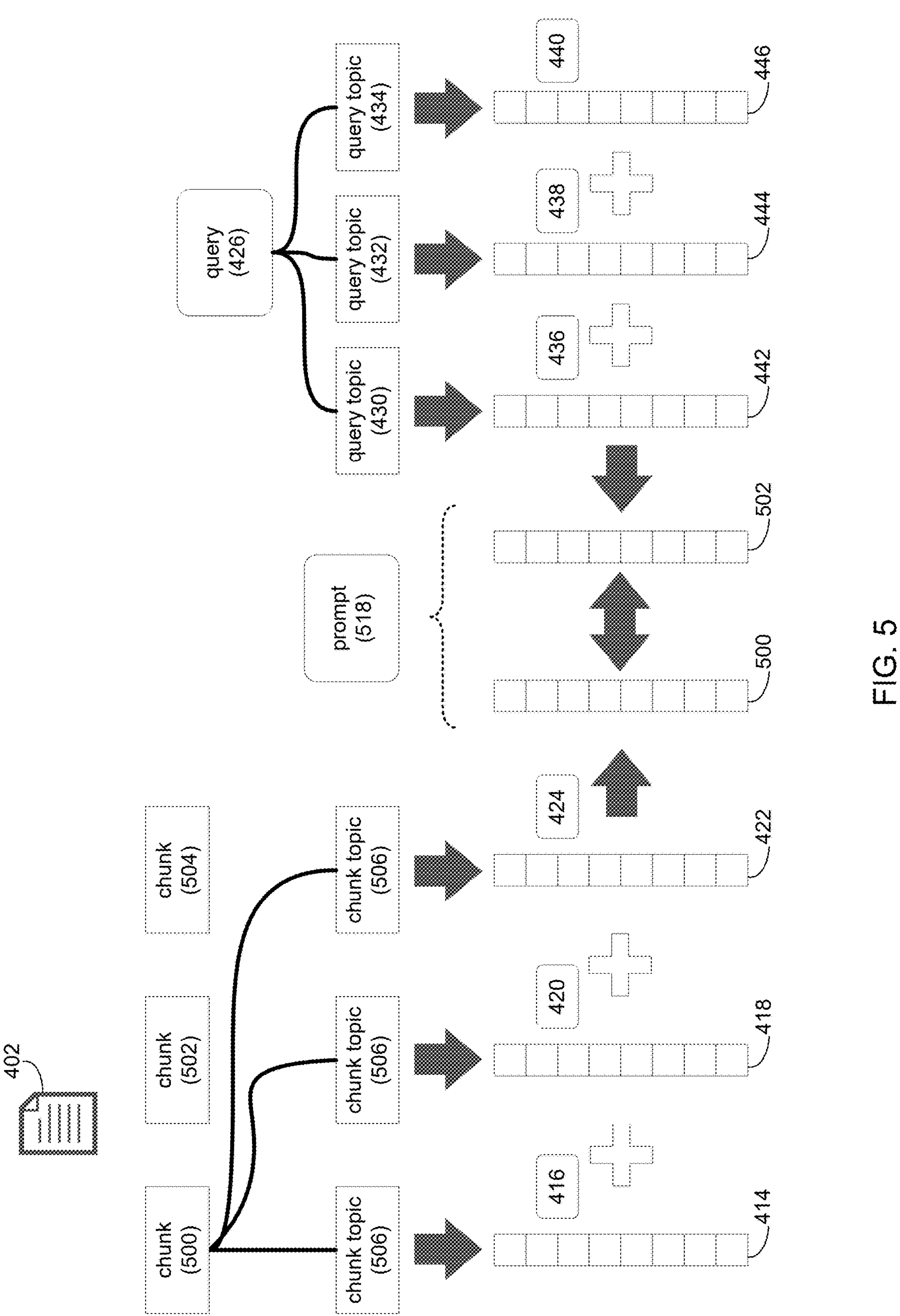
FIG. 5 is an example diagrammatic view of a retrieval augmented generation (RAG) process with weighted average topic embeddings according to one or more example implementations of the disclosure.

Referring also to the examples of FIGS. 3-5 and in some implementations, query representation generation process 10 may process 300 a query using a generative artificial intelligence (AI) model. A topic of the query is extracted 302. A weighting for the topic of the query is generated 304. A weighted query topic embedding for the topic of the query is generated 306. A candidate chunk is identified 308 from a plurality of chunks of a target document by determining a similarity between the weighted query topic embedding and a plurality of chunk embeddings for the plurality of chunks. A prompt is generated 310 using the query and the candidate chunk. The prompt is provided 312 to the generative AI model.

As will be discussed in greater detail below, implementations of the present disclosure may allow for optimized semantic searching of a query against a plurality of document chunks to enhance retrieval augmented generation (RAG) performance with a generative AI model by generating and comparing weighted query representations and weighted chunk representations. For example, query representation generation process 10 uses keywords or topics to effectively represent a query and/or chunk for semantic searching. In some implementations, performing a similarity search between a short query and a large text chunk may not work very well. This is known in information retrieval as "asymmetric search." In general, it is advisable to match two pieces of text of equivalent size, and the best match is achieved between two short pieces of text. Accordingly, query representation generation process 10 provides different approaches to semantically "compress" large chunks of text into much smaller representations (e.g., topics) that capture the essence of the information in the text chunks, allowing for a more symmetric, and as a result more accurate, match between the user query and the chunk topics. Further, query representation generation process 10 compresses query into weighted representations (e.g., topics) to compare against the chunk topics. In this manner, the comparison of query topics and chunk topics ensure more semantic matching between a query and a chunk. As will be discussed in greater detail below, query representation generation process 10 performs enhanced RAG using weighted query representations (e.g., query topics) to identify the most relevant chunks from a document.

In some implementations, query representation generation process 10 generates 314 the plurality of chunks for a plurality of text portions of the target document. A chunk is a discrete portion of the document that is used to generate a chunk embedding for combination with a query embedding to provide content in a prompt provided to a generative AI model during RAG. Generating 314 the plurality of chunks includes generating an index or indexes for searching during query processing. As such, each generated chunk may be stored in a database or other data structure as an index. In some implementations, a generative AI model is a type of artificial intelligence system that is capable of generating new data samples that are similar to the training data it has been trained with. These models work by learning the underlying patterns and structures present in the training data and then using this "knowledge", they generate new, consistent examples.

In some implementations, the generative AI model includes a Large Language Model (LLM). A LLM (e.g., GPT-4 from OpenAI®, OpenLLaMa, and Cerebras-GPT) is a language model consisting of a neural network with many parameters (typically billions of weights or more), trained on large quantities of unlabeled text using self-supervised learning or semi-supervised learning. Though trained on simple tasks along the lines of predicting the next word in a sentence, LLMs with sufficient training and parameter counts capture the syntax and semantics of human language. In some implementations, the generative AI model includes a natural language processing (NLP) model. An NLP model (e.g., XLNet, Robustly Optimized Bidirectional Encoder Representations from Transformers Pretraining Approach (ROBERTa), and Pathways Language Model (PaLM)) is a model that concerns the understanding, analysis, and generation of natural language. NLP models analyze text and speech to extract meaning, as well as generating new text or speech in response.

As discussed above, many generative AI models, such as LLMs, are not trained on a particular library of input documents used for a particular scenario. As such, these generative AI models lack the context to process content from the library of input documents. Accordingly, the process of Retrieval Augmented Generation (RAG) is used to break the relevant input documents into chunks that are small enough to fit prompt size limitations associated with the generative AI model. Referring also to FIG. 4, query representation generation process 10 generates 314 a plurality of chunks for use during retrieval augmented generation (RAG). In some implementations, query representation generation process 10 includes a preprocessing phase of RAG used to prepare chunk embeddings for use during RAG to generate prompts. As shown in FIG. 4 and when preparing an input document for retrieval augmented generation (RAG), query representation generation process 10 processes a collection of input documents (e.g., document 400) and breaks each input document into chunks (e.g., document chunks 402, 404, 406). This is shown as action "1".

In some implementations, query representation generation process 10 generates 316 a plurality of chunk topics by extracting a topic for each respective chunk of the plurality of chunks. In some implementations, generating 316 the plurality of chunks includes performing topic extraction on the plurality of chunks of the document. For example, topic extraction is a natural language programming technique that automatically identifies the main key phrases, topics, or themes within a text portion. A machine learning model (not shown) may be employed to analyze text portions of a document and clusters them based on words or phrases to determine underlying patterns.

In one example, suppose chunk 402 includes the following content from a document (e.g., document 400) that concerns a detailed user manual for installing and operating a storage system (e.g., storage system 12):

Choose where to install the expansion enclosure.

Before installing the new expansion enclosure, you should determine the placement of the new expansion enclosure within the rack.

Steps:

1. It is recommended that you install the expansion enclosure in the next available 2U space directly above the base enclosure or the last expansion enclosure in the system.
2. Most cabinets mark 1U increments with horizontal lines or small holes in the channels.

In this example, query representation generation process 10 extracts a topic from chunk 402 (i.e., "expansion enclosure") (e.g., chunk topic 408). As will be discussed in another example below, query representation generation process 10 may extract one or more topics from a respective chunk (e.g., chunk topics 410, 412). In some implementations, topic extraction may identify a frequency of key phrases from chunk 402 and/or may match key phrases from chunk 402 to predefined key phrases or topics.

In some implementations, query representation generation process 10 generates 318 a weighting for the topic for each respective chunk of the plurality of chunks. A weighting for a topic may generally include a metric or score indicating the frequency of the respective topic in a chunk. For example, topic extraction may include assigning a weight to each topic that identifies the relevance of the respective topic to the chunk. In one example, query representation generation process 10 uses Term Frequency-Inverse Document Frequency (TF-IDF), which calculates a weight for each term based on how frequently it appears in a chunk (TF) and how rare it is across all chunks in the plurality of chunks (IDF). Terms that appear frequently in a chunk but are rare across the plurality of chunks are considered more important and receive higher weights. In another example, query representation generation process 10 uses probabilistic topic modeling, where each word in a chunk is assigned a probability of belonging to each topic. These probabilities are then used to determine the contribution of each word to each topic, which helps in weighting the importance of terms within topics. While two examples of weighting have been described, it will be appreciated that various weighting methodologies may be used within the scope of the present disclosure.

In some implementations, query representation generation process 10 generates 320 a plurality of weighted chunk topic embeddings by generating a weighted chunk topic embedding for each chunk. For example, query representation generation process 10 indexes each chunk topic using word embeddings with its respective weight. For example, the Bidirectional Encoder Representations from Transformers (BERT) sentence transformer uses a space of 384 embeddings. In this example, each chunk topic is passed through the transformer, and a vector of 384 numbers corresponding to the 384 dimensions is outputted. The resulting chunk topics and their vector embeddings (e.g., weighted chunk topic embedding 414 with weighting 416 for chunk topic 408) are stored in a database. This is shown as action "3" in FIG. 4 which completes the preprocessing of input documents and weighted chunk topic embeddings for use during RAG.

In some implementations, query representation generation process 10 generates 322 a weighted chunk topic embedding for each topic of a plurality of topics for a respective chunk. Returning to the above example, query representation generation process 10 extracts multiple topics (i.e., chunk topic 408-"expansion enclosure"; chunk topic 410—"last expansion enclosure"; and chunk topic 412-

"rack") from chunk 402. In this example, query representation generation process 10 generates 322 weighted chunk topic embedding 414 with weighting 416 for chunk topic 408; weighted chunk topic embedding 418 with weighting 420 for chunk topic 410; and weighted chunk topic embedding 422 with weighting 424 for chunk topic 412.

In some implementations, query representation generation process 10 generates 324 a weighted average chunk topic embedding for the respective chunk from the weighted chunk topic embedding for each topic of the plurality of topics for the respective chunk. For example, query representation generation process 10 combines the plurality of weighted chunk topic embeddings for each topic of a respective chunk using a weighted average of the weights of each weighted chunk topic embedding. In the example of FIG. 5, query representation generation process 10 combines weighted chunk topic embeddings 414, 418, 422 to generate weighted average chunk topic embedding 500. As will be discussed in greater detail below, query representation generation process 10 uses the chunks associated with weighted average chunk topic embedding 500 as candidate chunks for inclusion in a prompt generated with a query.

In some implementations, query representation generation process 10 processes 300 a query using a generative artificial intelligence (AI) model. For example, a query (e.g., query 426) is a request for obtaining information from generative AI model 428. In one example, query 426 is a text-based request. In another example, query 426 is a text-based request generated from a user selection and/or a user's speech (e.g., using an automated speech recognition system (not shown)). Accordingly, query representation generation process 10 may receive query 426 for processing using generative AI model 514.

In some implementations, query representation generation process 10 extracts 302 a topic of the query. As discussed above, topic extraction is a natural language programming technique that automatically identifies the main key phrases, topics, or themes within a text portion. A machine learning model (not shown) may be employed to analyze text portions of a document and clusters them based on words or phrases to determine underlying patterns. In one example, suppose query 426 is "How do I determine the placement of the new expansion enclosure?". In the example, query representation generation process 10 extracts 302 a topic (e.g., query topic 430) concerning "new expansion enclosure". While an example of single topic has been described, it will be appreciated that any number of topics may be extracted within the scope of the present disclosure. For example and in some implementations, extracting 302 the topic includes extracting 326 a plurality of topics for the query. Returning to the above example, query representation generation process 10 further extracts 326 "placement" as query topic 432 and "determine" as query topic 434.

In some implementations, query representation generation process 10 generates 304 a weighting for the topic of the query. As discussed above, a weighting for a topic may generally include a metric or score indicating the frequency of the respective topic in a chunk. For example, topic extraction may include assigning a weight to each topic that identifies the relevance of the respective topic to the chunk. Continuing with the above example, query representation generation process 10 generates 304 a weighting for query topic 430-"new expansion enclosure" as the value "0.618" (e.g., weighting 436). In some implementations, generating 304 the weighting for the topic includes generating 328 a weighting for each topic of the plurality of topics for the query. Accordingly, query representation generation process 10 generates 328 a weighting for query topic 432-"placement" as the value "0.291" (e.g., weighting 438) and a weighting for query topic 434 "determine" as the value "0.091" (e.g., weighting 440).

In some implementations, query representation generation process 10 generates 306 a weighted query topic embedding for the topic of the query. As discussed above relative to weighted chunk topic embeddings, query representation generation process 10 generates a plurality of weighted query topic embeddings by generating a weighted query topic embedding for each query topic. For example, query representation generation process 10 indexes each query topic using word embeddings with its respective weight. In the above example, query representation generation process 10 generates 330 weighted query topic embedding 442 with weighting 438. In some implementations, generating the weighted query topic embedding includes generating 330 a weighted query topic embedding for each topic. Continuing with the above example, query representation generation process 10 generates 330 weighted query topic embedding 444 with weighting 440 for query topic 432; and weighted query topic embedding 446 with weighting 440 for query topic 434. This is shown as action "4" in FIG. 4 which allows query topics to be compared with chunk topics during the processing of query 426.

In some implementations, query representation generation process 10 generates 332 a weighted average query topic embedding from the weighted query topic embedding for each topic. For example, query representation generation process 10 combines the plurality of weighted query topic embeddings for each topic of query 426 using a weighted average of the weights of each weighted query topic embedding. In the example of FIG. 5, query representation generation process 10 combines weighted query topic embeddings 442, 444, 446 to generate weighted average query topic embedding 502.

In some implementations, query representation generation process 10 identifies 308 a candidate chunk from a plurality of chunks of a target document by determining a similarity between the weighted query topic embedding and a plurality of chunk embeddings for the plurality of chunks. For example, the similarity may be determined by calculating a cosine similarity between weighted query topic embedding 414 and plurality of chunk embeddings. However, it will be appreciated that other comparison algorithms may be used to identify a sufficiently similar respective chunk embedding from the plurality of chunk embeddings compared to weighted query topic embedding 414. In some implementations, query representation generation process 10 uses a similarity threshold for comparing weighted query topic embedding 414 and the plurality of chunk embeddings. This matching step can be done efficiently using vector search. This is shown as action "5" in FIG. 4.

In some implementations, identifying 308 the candidate chunk includes determining a similarity between the weighted average query topic embedding and a plurality of weighted average chunk topic embeddings for the plurality of chunks. For example and as shown in FIG. 5, the similarity may be determined by calculating a cosine similarity between weighted average query topic embedding 502 and the weighted average chunk topic embeddings of respective chunks (e.g., weighted average chunk topic embedding 500). However, it will be appreciated that other comparison algorithms may be used to identify a sufficiently similar respective weighted average chunk topic embedding from the plurality of weighted average chunk topic embeddings compared to weighted average query topic embedding 502. In some implementations, query representation generation process 10 uses a similarity threshold for comparing weighted average query topic embedding 502 and the plurality of weighted average chunk topic embeddings.

In some implementations, identifying 308 a candidate chunk includes identifying 334 a predefined number of most similar candidate chunks. For example, query representation generation process 10 may identify 334 a predefined number of most similar candidate chunks for inclusion in a prompt (e.g., prompt 448). The predefined number of most similar candidate chunks may be a user-defined value, a default-value, and/or may be a function of the total prompt size. For example, prompt 448 may have a limited size such that query representation generation process 10 identifies 334 the most similar candidate chunks until the prompt size is reached. In one example, query representation generation process 10 identifies the top ten most similar candidate chunks for inclusion in prompt 448. However, it will be appreciated that any number of most similar candidate chunks may be identified within the scope of the present disclosure.

In an example using traditional RAG, no correct chunks were identified to address query 426. For example, the traditional RAG returned chunks as follows:

Chunk #1 (Cosine Similarity 0.872)

Summary of tasks for adding an expansion enclosure.

To add an expansion enclosure to a running system, complete the tasks below in the order in which they appear. This document provides instructions for completing each task.

NOTE: When adding an expansion enclosure to a running system, you must power on the expansion enclosure before attaching the back-end cables.

1. Verify the contents of the shipping package.
2. Choose the space in the cabinet for the new expansion enclosure.
3. Remove the filler panels that cover the cabinet space for the new expansion enclosure.
4. Install the rails for the new expansion enclosure in the cabinet.
5. Install the expansion enclosure on the rails.
6. Install the cable management arms.
7. Apply cable labels.
8. Route the data cables and power cords through the cable management arms.
9. Attach the power cables to the new expansion enclosure.
10. Close the cable management arms.
11. Test the cable management arms.
12. Plug the power cables into the power source.
13. Attach the expansion (back-end) cables to the new expansion enclosure.
14. If the new expansion enclosure shipped without its drives installed, install the drives in the expansion enclosure.
15. Install the front bezel on the new expansion enclosure.

Chunk #2 (Cosine Similarity 0.869)

Summary of tasks for installing an expansion enclosure.

To install an expansion enclosure, complete the tasks below in the order in which they appear. This document provides instructions for completing each task.

1. Verify the contents of the shipping package.
2. Choose the space in the cabinet for the new expansion enclosure.
3. Remove the filler panels that cover the cabinet space for the new expansion enclosure.
4. Install the rails for the new expansion enclosure in the cabinet.
5. Install the expansion enclosure on the rails.
6. If the new expansion enclosure shipped without its drives installed, install the drives in the expansion enclosure.
7. Install the front bezel on the new expansion enclosure.
8. Apply cable labels.
9. Attach the expansion (back-end) cables, and then attach the power cables.

Chunk #3 (Cosine Similarity 0.861)

Summary of tasks for installing an expansion enclosure.

To install an expansion enclosure, complete the tasks below in the order in which they appear. This document provides instructions for completing each task.

1. Verify the contents of the shipping package.
2. Choose the space in the cabinet for the new expansion enclosure.
3. Remove the filler panels that cover the cabinet space for the new expansion enclosure.
4. Install the rails for the new expansion enclosure in the cabinet.
5. Install the expansion enclosure on the rails.
6. Install the cable management arms.
7. Apply cable labels.
8. Attach the expansion (back-end) cables, and then attach the power cables.
9. Close the cable management arms.
10. Test the cable management arms.
11. If the new expansion enclosure shipped without its drives installed, install the drives in the expansion enclosure.
12. Install the front bezel on the new expansion enclosure.

From the above chunks, the traditional RAG approach identifies chunk #1 as the most similar given its cosine similarity (e.g., 0.872). However, this chunk does provide the correct information given query 426 asking "How do I determine the placement of the new expansion enclosure" despite the high cosine similarity between query 426 and this chunk generally.

In some implementations, query representation generation process 10 generates 310 a prompt using the query and the candidate chunk. Returning to the above example of FIG. 5 and in contrast to traditional RAG, suppose query representation generation process 10 identifies chunks 400, 402, and 404 as the most similar candidate chunks. Query representation generation process 10 generates a prompt (e.g., prompt 448) using the combination of chunks 402, 404, 406 (which do not include chunks #1-3 as described above in the example of traditional RAG) and query 426. In this example, chunk 400 includes the correct content for resolving query 426 and is used to generate 310 prompt 448.

In some implementations, query representation generation process 10 provides 312 the prompt to the generative AI model. For example, with the context of chunks 400, 402, 404 (of which chunk 400 includes the correct content to resolve query 426), prompt 448 includes chunks 400, 402, 404 and query 426 for processing. In this example, query representation generation process 10 provides 312 prompt 448 to the LLM (e.g., generative artificial intelligence (AI) model 428). This is shown as action "6" in FIG. 4. The LLM output (e.g., output 450) is presented to the user. This is shown as action "7" in FIG. 4. Accordingly, query representation generation process 10 enhances the matching of queries and chunks of an input document using weighted representations of queries and chunks.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:

receiving a query to be processed by a generative artificial intelligence (AI) model;

extracting a query topic from the query;

generating a weighted query topic embedding for the query topic;

generating a plurality of weighted chunk topic embeddings for a plurality of chunks based on a frequency of each term in a particular chunk from a plurality of chunks of a target document and each term's frequency across all of the plurality of chunks;

identifying a candidate chunk from the plurality of chunks by determining a similarity between the weighted query topic embedding and the plurality of weighted chunk topic embeddings for the plurality of chunks;

generating a prompt using the query and the candidate chunk; and providing the prompt to the generative AI model.

2. The computer-implemented method of claim 1, wherein identifying a candidate chunk includes identifying a predefined number of most similar candidate chunks.

3. The computer-implemented method of claim 1, further comprising:

generating the plurality of chunks for a plurality of text portions of the target document;

generating a plurality of chunk topics by extracting a topic for each respective chunk of the plurality of chunks; and generating a weighting for the topic for each respective chunk of the plurality of chunks.

4. The computer-implemented method of claim 3, further comprising:

generating a weighted chunk topic embedding for each topic of a plurality of topics for a respective chunk; and generating a weighted average chunk topic embedding for the respective chunk from the weighted chunk topic embedding for each topic of the plurality of topics for the respective chunk.

5. The computer-implemented method of claim 1, wherein extracting the query topic includes extracting a plurality of topics for the query.

6. The computer-implemented method of claim 5, wherein generating the weighted query topic embedding includes generating a weighting for each topic of the plurality of topics for the query.

7. The computer-implemented method of claim 6, wherein generating the weighted query topic embedding includes:

generating a weighted query topic embedding for each topic; and generating a weighted average query topic embedding from the weighted query topic embedding for each topic.

8. A computer program product residing on a non-transitory computer readable medium having a plurality of instructions stored thereon which, when executed by a processor, cause the processor to perform operations comprising:

receiving a query to be processed by a generative artificial intelligence (AI) model;

extracting a query topic from the query;

generating a weighted query topic embedding for the query topic;

generating a plurality of weighted chunk topic embeddings for a plurality of chunks based on a frequency of each term in a particular chunk from a plurality of chunks of a target document and each term's frequency across all of the plurality of chunks;

identifying a candidate chunk from the plurality of chunks by determining a similarity between the weighted query topic embedding and the plurality of weighted chunk topic embeddings for the plurality of chunks;

generating a prompt using the query and the candidate chunk; and providing the prompt to the generative AI model.

9. The computer program product of claim 8, wherein identifying a candidate chunk includes identifying a predefined number of most similar candidate chunks.

10. The computer program product of claim 8, wherein the operations further comprise:

generating the plurality of chunks for a plurality of text portions of the target document;

generating a plurality of chunk topics by extracting a topic for each respective chunk of the plurality of chunks; and generating a weighting for the topic for each respective chunk of the plurality of chunks.

11. The computer program product of claim 8, wherein the operations further comprise:

generating a weighted chunk topic embedding for each topic of a plurality of topics for a respective chunk; and generating a weighted average chunk topic embedding for the respective chunk from the weighted chunk topic embedding for each topic of the plurality of topics for the respective chunk.

12. The computer program product of claim 8, wherein extracting the query topic includes extracting a plurality of topics for the query.

13. The computer program product of claim 12, wherein generating the weighted query topic embedding includes generating a weighting for each topic of the plurality of topics for the query.

14. The computer program product of claim 13, wherein generating the weighted query topic embedding includes:

generating a weighted query topic embedding for each topic; and generating a weighted average query topic embedding from the weighted query topic embedding for each topic.

15. A computing system comprising:

a memory; and a processor configured to:

receive a query to be processed by a generative artificial intelligence (AI) model, extract a query topic from the query, generate a weighted query topic embedding for the query topic, generate a plurality of weighted chunk topic embeddings for a plurality of chunks based on a frequency of each term in a particular chunk from a plurality of chunks of a target document and each term's frequency across all of the plurality of chunks, identify a candidate chunk from the plurality of chunks by determining a similarity between the weighted query topic embedding and the plurality of weighted chunk topic embeddings for the plurality of chunks, generate a prompt using the query and the candidate chunk, and provide the prompt to the generative AI model.

16. The computing system of claim 15, wherein identifying a candidate chunk includes identifying a predefined number of most similar candidate chunks.

17. The computing system of claim 15, wherein the processor is further configured to:

generate the plurality of chunks for a plurality of text portions of the target document;

generate a plurality of chunk topics by extracting a topic for each respective chunk of the plurality of chunks; and generate a weighting for the topic for each respective chunk of the plurality of chunks.

18. The computing system of claim 17, wherein the processor is further configured to:

generate a weighted chunk topic embedding for each topic of a plurality of topics for a respective chunk; and generate a weighted average chunk topic embedding for the respective chunk from the weighted chunk topic embedding for each topic of the plurality of topics for the respective chunk.

19. The computing system of claim 15, wherein extracting the topic includes extracting a plurality of topics for the query.

20. The computing system of claim 19, wherein generating the weighting for the topic includes generating a weighting for each topic of the plurality of topics for the query.

* * * * *